(12) United States Patent
Agmon et al.

(10) Patent No.: US 9,036,644 B2
(45) Date of Patent: May 19, 2015

(54) METHOD OF PROVISIONING H-VPLS SERVICES IN A MULTI-DOMAIN MPLS NETWORK

(71) Applicant: ECI Telecom Ltd., Petach Tikva (IL)

(72) Inventors: Gideon Agmon, Kfar Saba (IL); Vadim Dukhovny, Petach-Tikva (IL)

(73) Assignee: ECI TELECOM LTD., Petach Tikva (IL)

( * ) Notice: Subject to any disclaimer, the term of this patent is extended or adjusted under 35 U.S.C. 154(b) by 107 days.

(21) Appl. No.: 13/959,199

(22) Filed: Aug. 5, 2013

(65) Prior Publication Data

US 2014/0036910 A1 Feb. 6, 2014

(30) Foreign Application Priority Data

Aug. 5, 2012 (IL) .......................................... 221303

(51) Int. Cl.
*H04L 12/28* (2006.01)
*H04L 12/723* (2013.01)

(52) U.S. Cl.
CPC ..................................... *H04L 45/50* (2013.01)

(58) Field of Classification Search
CPC ...... H04L 12/46; H04L 12/462; H04L 12/465
USPC .......... 370/400, 401, 405, 406, 411; 709/220, 709/223, 227, 249, 251
See application file for complete search history.

(56) References Cited

U.S. PATENT DOCUMENTS

| | | | | |
|---|---|---|---|---|
| 7,792,123 B2 * | 9/2010 | Hu | ............................ | 370/395.53 |
| 7,843,917 B2 * | 11/2010 | Brockners et al. | ............ | 370/389 |
| 8,243,728 B2 * | 8/2012 | Sato | .............................. | 370/389 |
| 8,665,883 B2 * | 3/2014 | Balus et al. | .............. | 370/395.53 |
| 8,724,627 B2 * | 5/2014 | Filsfils et al. | ................. | 370/390 |
| 2012/0243545 A1 * | 9/2012 | Zhang et al. | ............. | 370/395.53 |
| 2013/0058257 A1 * | 3/2013 | Dukhovny | ..................... | 370/256 |

* cited by examiner

*Primary Examiner* — Dmitry H Levitan
(74) *Attorney, Agent, or Firm* — Browdy and Neimark, PLLC

(57) ABSTRACT

A method is disclosed for provisioning loop free H-VPLS traffic service in a multi-domain MPLS network having interconnected domains. The method comprises: provisioning pseudo wires (PWs) for MPTMP services in each domain of the MPLS network; defining multiple Split Horizon Groups (SHGs) in the network, wherein each SHG corresponds to a domain, for the H-VPLS service traffic and for each specific node of the MPLS network, automatically assigning indications to SHG and the pseudo wires connected to the specific node, wherein the same indication is assigned to all pseudo wires belonging to the same group (SHG-N), and wherein the step of assigning is characterized in that when traffic belonging to H-VPLS service crosses a border network node located between two interconnected domains, the SHG-N indication of PWs remains the same within a VPLS domain thereby preventing the service traffic from returning to the domain of origin.

18 Claims, 5 Drawing Sheets

METHOD OF PROVISIONING H-VPLS SERVICES IN A MULTI-DOMAIN MPLS NETWORK

CROSS-REFERENCE TO RELATED APPLICATIONS

This application claims priority of Israel Patent Application No. 221303, filed Aug. 5, 2012, the disclosure of which is incorporated by reference herein in its entirety.

FIELD OF TECHNOLOGY

The present invention relates to provisioning of MPLS-based H-VPLS services in a network comprising multiple H-VPLS domains.

BACKGROUND

Legend

MPLS network—multi protocol label switching network;

LSP or tunnel—a label-switched path (LSP) is a path extending through an MPLS network. The path is set up based on criteria in the forwarding equivalence class (FEC). The path begins at a label edge router (LER), which makes a decision on which label to prefix to a packet based on the appropriate FEC. It then forwards the packet along to the next router in the path, which swaps the packet's outer label for another label, and forwards it to the next router. The last router in the path removes the label from the packet and forwards the packet based on the header of its next layer. Due to the forwarding of packets through an LSP being opaque to higher network layers, an LSP is also sometimes referred to as an MPLS tunnel;

Pseudo-wire (PW)—Pseudo-wire is an emulation of a point-to-point connection over a packet-switching network (PSN). The pseudowire emulates the operation of a "transparent wire" carrying the service. For example, a logical bidirectional connection between two network elements in an MPLS network;

SHG—A Split Horizon Group comprising VSI interfaces (or pseudo wires PWs) as members of a Split Horizon group. The purpose of forming SHG is prevention of traffic loops, hence SHG is characterized in that traffic service cannot flow between members of the same split horizon group whereas it may be forwarded out of the group;

SHG N—Split Horizon Group number. Theoretically, a network may comprise several SHGs which may be numbered. In such a case, traffic may pass from a member of a specific SHG to members of other SHGs. As mentioned above with respect to SHG, PWs of a traffic service belonging to the same SHG are part of the same split horizon, so the traffic arriving from such a PW must not be forwarded to other PWs belonging to the same group;

Spoke PW (or spoke)—In Virtual Private LAN Service (VPLS) network, the VPLS core PWs (hub) are augmented with access PWs (spoke) to form a two-tier H-VPLS. For each VPLS service, a single spoke PW is setup between u-PE (which is a device that supports Layer 2 switching and does all the normal bridging functions of learning and replication on all its ports, including spoke PW) and n-PE (which is a device that supports all bridging functions for VPLS service and supports the routing and MPLS encapsulation like in basic VPLS devices). Unlike traditional PWs that terminate on a physical or logical port, a spoke PW terminates on a VSI on u-PE and n-PE devices. The u-PEs and n-PEs treat each spoke connection like an attachment circuit of the VPLS service. The PW label is used to associate the traffic from the spoke PW to a VPLS instance. Further explanation on spoke PW may be found in IETF RFC 4762 entitled "Virtual Private LAN Service (VPLS) Using Label Distribution Protocol (LDP) Signaling".

VPLS—Virtual Private LAN Service (VPLS) is a virtual private network (VPN) technology which allows any-to-any (multipoint to multipoint, also known as MPTMP) connectivity.

H-VPLS (H-VPLS)—Hierarchical Virtual Private LAN Service, introduced to improve the scalability of VPLS, for providing layer 2 Virtual Private Network (VPN) services over MPLS network. H-VPLS may also be used to join two VPLS mesh structures together. Without using H-VPLS, every node in each VPLS mesh must become meshed with all nodes in the other VPLS mesh. However, with H-VPLS, the two meshes can essentially be joined together at certain locations. Techniques such as redundant pseudo-wires can provide resiliency in case of failures at the interconnection points.

MP2MP—Multi-Point-to-Multi-Point type of traffic is service which may be provided in VPLS and H-VPLS compatible networks.

In a single-domain (also known as "flat") MPLS network, MP2MP service requires provisioning of a full mesh of tunnel LSPs between all the PE routers that participate in a VPLS MP2MP service. The service therefore requires $n*(n-1)/2$ PWs extending between the PEs, implying operation (or signaling), and requires frame replication that is not scalable. To alleviate the problem, HVPLS (or H-VPLS) was defined by the IETF as a topology for merging a number of VPLS domains. An example for MPLS-based H-VPLS is illustrated in FIG. 1. As described in IETF RFC 4762, H-VPLS topology is based on connecting between different VPLS domains via spoke PWs (designated as PW-1 in FIG. 1). While this scheme is suitable for simple topologies like those discussed in RFC 4762, in practice it has several disadvantages, which have adverse effects upon the operability in accordance with this solution.

FIG. 2 demonstrates two VPLS domains (two rings are demonstrated in this example) connected via a single PE (aggregation node). This PE is connected to each VPLS domain via a spoke (or spokes) as shown in this FIG, where two known alternatives of connecting two ring-like VPLS domains are demonstrated. The first alternative is a single spoke (ring 1a in FIG. 2) whereas the second is via dual homed spokes (ring 1b in FIG. 2).

When using a single spoke (ring 1a), all the traffic which is expected to reach ring 1b, passes along a single direction and via a single ring node belonging to ring 1a. Consequently, the following disadvantages may be experienced:

Degraded performance—as the access node of the ring is typically less powerful than the aggregation node;

Less ring BW utilization—one of the ring connections to the aggregation node is not used in its normal state; and Full equipment protection in the access node is also required, to avoid single point of failure.

On the other hand, when using a solution that involves dual home spokes (e.g. ring 1b), that means that an additional mechanism is applied along with its operational and implementation complexity, a result which is not always acceptable to the operators.

FIG. 4 presents yet another example of interconnecting multiple VPLS domains, where each of the domains is covered by full mesh connectivity formed by PWs.

Still another configuration is illustrated in FIG. 5 where single spokes between two VPLS domains may be used.

The Problem

As may be noted, each of the VPLS domains shown in FIGS. 1-5 is provided with an indication (1, 2, etc.) of its respective PWs, and the indications used are the same for PWs belonging to the same VPLS domain, i.e., to the same SHG (split horizon group).

Each of the PWs, on a VPLS service basis, whether incoming to or outgoing from a specific node/PE (including nodes such as the aggregation node), must be provided with an indication of its SHG number, SHG-N.

Identical indications of PWs of the same SHG are intended to prevent, at a node level, returning of traffic obtained from a VPLS domain/SHG to the same VPLS domain/SHG, and to allow only forwarding of traffic from one VPLS domain to another, namely via a PW having a different SHG indication. However, it should be noted that as the integer N in the expression SHG-N has a local meaning within the specific node it is used, in case of an aggregation node that serves for SHGs interconnection, the SHG indications of PWs at the different sides of the aggregation node may be either different or the same at both sides.

As explained hereinabove, the correct indication/numeration of PWs in the network is a crucial factor in avoiding traffic loops (as it will prevent traffic from circulating at the same VPLS domain=SHG). In the prior art solutions, the PW indication is usually handled manually, by an operator. However, as may be appreciated from the examples illustrated in FIGS. 2 and 5, when considering cases with multiple VPLS domains, for each node and per each service, each PW must be configured with the proper VPLS SHG number. When more than one VPLS domain is associated with the same node (which is a typical situation in modern networks), this task of providing indications to/numeration of PWs becomes more and more complex, to practically impossible to carry out manually such a process in MPLS multi-domain networks. However, the solutions disclosed in the prior art do not allow the option of taking this manual process and simply have it converted into an automatic process.

FIG. 6 illustrates a simple example of a configuration/numeration error implication, in order to allow the reader to better understand the difficulty involved with the situation described. Basically, assigning a PW with a wrong SHG number results in either:

Packet loop, which may adversely affect the whole network in addition to the service itself; and Packet duplication, implying a major fault in the service.

SUMMARY OF THE DISCLOSURE

It is an object of the present invention to provide a method for forming multiple SHG groups in a multi-domain MPLS network, in order to allow any specific H-VPLS traffic to cross/cover the network without generating traffic loops.

It is another object of the invention to enable performing automatic marking (associate indications) of a vast number of PWs so as to enable forwarding traffic of each H-VPLS between multiple SHG groups.

As will be appreciated by those skilled in the art, each network node in a typical network usually handles not one, but multiple traffic services (H-VPLS), so that the task becomes extremely multidimensional task and the complexity thereof increases dramatically.

Other objects of the present invention will be further described as the description of the invention proceeds.

According to a first embodiment, there is provided a method for the provisioning loop free H-VPLS traffic services in a multi-domain MPLS network, where the domains are interconnected there-between, the method comprising:

provisioning pseudo wires (PWs) for MPTMP services in each domain of the multi-domain MPLS network;

defining multiple Split Horizon Groups (SHGs) in the network, wherein each SHG corresponds to a specific domain, for the H-VPLS service traffic, for each specific node of the multi-domain MPLS network, assigning automatically (e.g. by the network management system, NMS, or by any another applicable controlling entity) indications (e.g. SHG-N: names, numbers, etc.) to SHG and the pseudo wires connected to that specific node, wherein the same indication is assigned to all pseudo wires belonging to the same group (SHG-N), and wherein the step of assigning is characterized in that when traffic belonging to H-VPLS service crosses a border node located between two interconnected domains, the SHG-N indication of PWs remains always the same within a VPLS domain, thereby preventing the service traffic from returning to the same domain from which it had been conveyed (i.e., prevent forming of traffic loops).

As will be appreciated by those skilled in the art, the SHGs are Split Horizon Domains, and they may be constructed by an operator or by the NMS per physical network domains (i.e., a group of network nodes/PEs). However, each of the SHGs should be applied (or not) per traffic service (H-VPLS), independently of the other SHGs, and the indication (SHG-N) associated therewith, will be per service and per node.

The network domains may also be referred to as VPLS domains, since they are intended for VPLS traffic (within a domain) and H-VPLS traffic (over two or more VPLS domains).

According to another embodiment there is provided a method for provisioning a loop free H-VPLS MPTMP service in an MPLS network comprising a plurality of network nodes, wherein the method comprises:

(i) dividing the MPLS network into a plurality of VPLS domains, and forming full mesh connectivity for each of the VPLS domains by interconnecting network nodes thereof using pseudo-wires (PWs);

(ii) associating each network node that belongs to two or more of the plurality of VPLS domains, to each of these two or more of the plurality of VPLS domains;

(iii) for each network node that belongs to two or more of the plurality of VPLS domains, associating automatically (e.g. numerating) each PW of a specific VPLS domain with a PW indication that corresponds to the SHG-N of the specific VPLS domain, so that for each specific node of a specific VPLS domain, the indication is common (identical) to all PWs of the specific VPLS domain but different from indications associated with PWs of other VPLS domain(s) bordering with that specific VPLS domain at the respective network node; and (iv) transmitting H-VPLS traffic of the MPTMP service via two or more VPLS domains in the MPLS network, wherein service traffic received along a first PW is prevented from being conveyed along a second PW associated with a PW indication that is identical to the PW indication (e.g. identical to the SHG-N) associated with the first PW.

Thus, according to the above described embodiment, the proper SHG number/indication may be associated with each PW in each VPLS domain. The method may be implemented as an automatic (computerized) algorithm to be used by a management entity of the network, such as NMS, to automatically assign the SHG indications to VPLS domains and their PWs, and to inform/configure network nodes about the indications of relevant PWs associated with the respective network nodes.

Without the solution described herein, the task of marking a vast number of PWs as in typical in nowadays network, in order to enable forwarding traffic of each H-VPLS between multiple SHG groups would have no practical solution, as:
1. Manual configuration of each PW SHG per the network topology is prone to errors (each service may include several rings, e.g. when aggregating access rings, each with several nodes associated therewith) so it would be an enormous cumbersome task for the operator to establish and verify an error-free configuration.
2. The original PW set up is carried out automatically by the NMS. However, manual configuration of the PW SHG implies that the whole configuration should be carried out manually, which, as explained above, is simply unacceptable.

The method described herein, is particularly applicable within VPLS domains of a so-called full mesh connectivity network, where each network node is provided with a direct logical connection (PW) to any one of other network nodes. The full mesh connectivity thus allows providing MP-to-MP traffic services throughout the network. Therefore, if a specific H-VPLS service traffic passes through a VPLS domain (SHG), it would be conveyed directly from a network node at which it was generated within the domain, to a border network node where it would leave that domain.

According to another embodiment, in order to better implement the proposed solution in modern complex networks, the PWs are classified into two different classes of PWs, and/or the network domains may also be classified into two different classes.

Specifically, the network (VPLS) domains may be classified into class 1 being a regular PW domain, and class 2, being spoke domains. Similarly, the PWs may be classified into class 1 being regular PWs and class 2, being PW spokes. A spoke PW is a PW which is not part of a regular VPLS split horizon group, and traffic arriving from a spoke PW is allowed to pass to/from any SHG members (PEs) as well as to/from all other spoke PWs associated with the service.

According to another embodiment, the PW spokes are given special type indications to enable transmission of any traffic (from any other PWs marked with other indication(s)) through the PW spokes.

By still another embodiment, each PW spoke forms its own spoke domain, and assigns its own SHG, i.e. forms its own SHG, and is given a unique special indication (for example, "Null" or "Spoke SHG" which will not be used for any of the other PWs and domains).

As has already been mentioned, regular PWs belonging to a certain SHG are all given the same indication (at a node) which in turn results in that while applying the conventional SHG rule, once traffic of the same MPLS service enters a node, it cannot exit the node along a PW associated with the same indication (and consequently cannot return to the same network domain, forming a loop thereby, but may exit to another domain where the same MPLS service will have different indications on any PW extending from the node).

The different indication may be for example the special indication for a spoke PW/spoke SHG, or simply a different SHG number.

Within the framework of the present description, PW spokes may be classified into real PW spokes and virtual PW spokes. A real PW spoke is characterized by having a termination point so that the PW spoke may transmit any traffic of any service to the termination point while no loops can be created. The term "virtual PW spoke" is used herein throughout the description and claims to denote a virtual entity that connects between two VPLS domains, as opposed to real spoke PW that connects to a VPLS termination point (the edge of the network).

In addition, virtual spokes may be associated with special indications, or may be marked by "null", as real spokes do.

In case of a dual homing connection configuration, the two spoke domains may be referred to as "mate spoke domains" since they both interconnect with the same domains. In other words, in this example two virtual spokes form two mate spoke domains.

According to still another embodiment, the method provided is further adapted to handle pseudo wires which connect different VPLS domains via dual homing topologies. Namely, the method may comprise a step of defining such dual homing (or mutually protected) PW connections as two spoke domains, and associate these spoke domains with their respective special SHG indications.

According to another aspect, there is provided a network management entity (such as NMS, EMS and the like) comprising one or more processors that are operative to automatically:

associate each network node that belongs to two or more VPLS domains of the network, to each of the two or more VPLS domains;

for each network node that belongs to the two or more VPLS domains, associate (e.g. numbering) each PW of a specific VPLS domain with a PW indication that corresponds to the SHG-N of the specific VPLS domain, so that for each specific node of a specific VPLS domain, there is one indication that is shared by all PWs of the specific VPLS domain, but different from indications of PWs of other VPLS domain(s) bordering with that specific VPLS domain at the respective network node; and causing prevention of conveyance of service traffic received along a first PW from being conveyed along a second PW associated with a PW indication that is identical to the PW indication associated with the first PW, when H-VPLS traffic of the MPTMP service will be transmitted via two or more VPLS domains in the MPLS network.

According to yet another aspect of the invention, there is provided a computer program product encoding a computer program stored on a non-transitory computer-readable medium for executing a set of instructions by a computer system comprising one or more computer processors for establishing a process for provisioning of a loop free H-VPLS MPTMP service in an MPLS network comprising a plurality of network nodes, wherein the process comprises:
(a) dividing the MPLS network into a plurality of VPLS domains, and forming full mesh connectivity for each of the VPLS domains by interconnecting network nodes thereof using pseudo-wires (PWs);
(b) associating each network node that belongs to two or more of the plurality of VPLS domains, to each of these two or more of the plurality of VPLS domains, and assigning automatically to each of these two or more of the plurality of VPLS domains, an SHG indication associated with their respective network node (SHG-N, e.g., a number);

(c) for each network node that belongs to two or more of the plurality of VPLS domains, automatically associating (e.g. numerating) each PW of a specific VPLS domain with a PW indication that corresponds to the SHG-N of the specific VPLS domain, so that for each specific node of a specific VPLS domain, said indication is common (identical) to all PWs of the specific VPLS domain but different from indications of PWs of other VPLS domain (s) bordering with said specific VPLS domain at said respective network node; and (d) enabling transmission of H-VPLS traffic of the MPTMP service via two or more VPLS domains in the MPLS network, wherein service traffic received along a first PW is prevented from being conveyed along a second PW associated with a PW indication that is identical to the PW indication associated with the first PW.

DETAILED DESCRIPTION OF EMBODIMENTS

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a thorough understanding of the present invention. It will be apparent, however, that the present invention may be practiced without these specific details.

Figure 7:
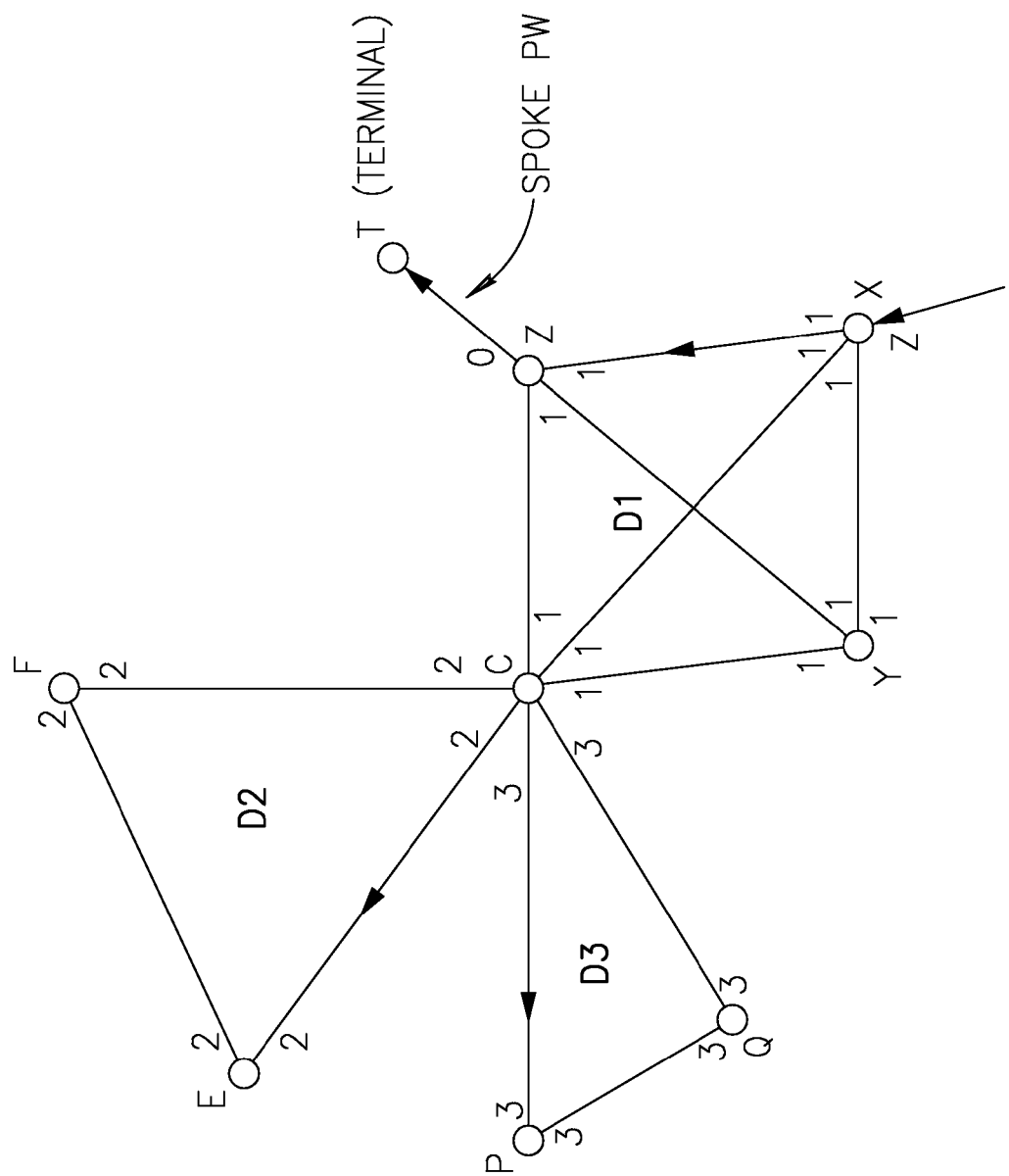
FIG. 7—illustrates a schematic presentation of an MPLS network that comprises domains D1, D2, D3 and a spoke domain.

FIG. 7 provides a schematic representation of an MPLS network that comprises domains D1, D2, D3 and a spoke domain.

Let us assume that an H-VPLS path is to be established over the exemplified network, for the provisioning of a certain service. This path is schematically shown by arrows. Traffic arrives via node X, passes through domains D1, D2, D3 and the spoke domain and reaches terminal T along a spoke PW.

In this example, indications (numbers) of the network domains for this H-VPLS service correspond to the numbers of SHGs formed in the relevant domains. Pseudo wires of the same SHG bear the same indications.

Different pseudo wires connected to node C have three different indications/numerals (each assigned per the domain it belongs to), since node C in this specific H-VPLS service, participates in three domains/three SHGs.

Table 1 illustrates a tunnel table formed in a network management entity (for example, NMS) for a specific service for the network illustrated in FIG. 7. Such a table may further comprise other PWs of all four mentioned domains that are relevant to the discussed MPLS service.

TABLE 1

| PW TABLE | SHG |
|---|---|
| For node X: | |
| X → Z | 1 |
| X → C | 1 |
| X → Y | 1 |
| For node C: | |
| C → F | 2 |
| C → E | 2 |
| C → Z | 1 |
| C → X | 1 |
| C → Y | 1 |
| C → P | 3 |
| C → Q | 3 |

It should be understood, that for other H-VPLS services, the NMS may assign other domains (SHGs) and other indications in a manner analog mutates mutandis to that shown in FIG. 7. Also, the NMS may comprise similar tables as table 1 per each H-VPLS traffic service.

The following Table 2 shows the number of different SHG allocated to certain nodes in the example illustrated in FIG. 7. In addition, there is capacity cap per node, not shown in this table, which limits each node by the maximal number of different SHGs that can be allocated thereto.

TABLE 2

| NODE TABLE | MAX SHG |
|---|---|
| X | 2 |
| Y | 2 |
| Z | 2 |
| C | 3 |
| . | . |
| . | . |
| . | . |

As can be seen, node C cannot support more than the three domains (SHGs) already appended to it.

Figure 1:
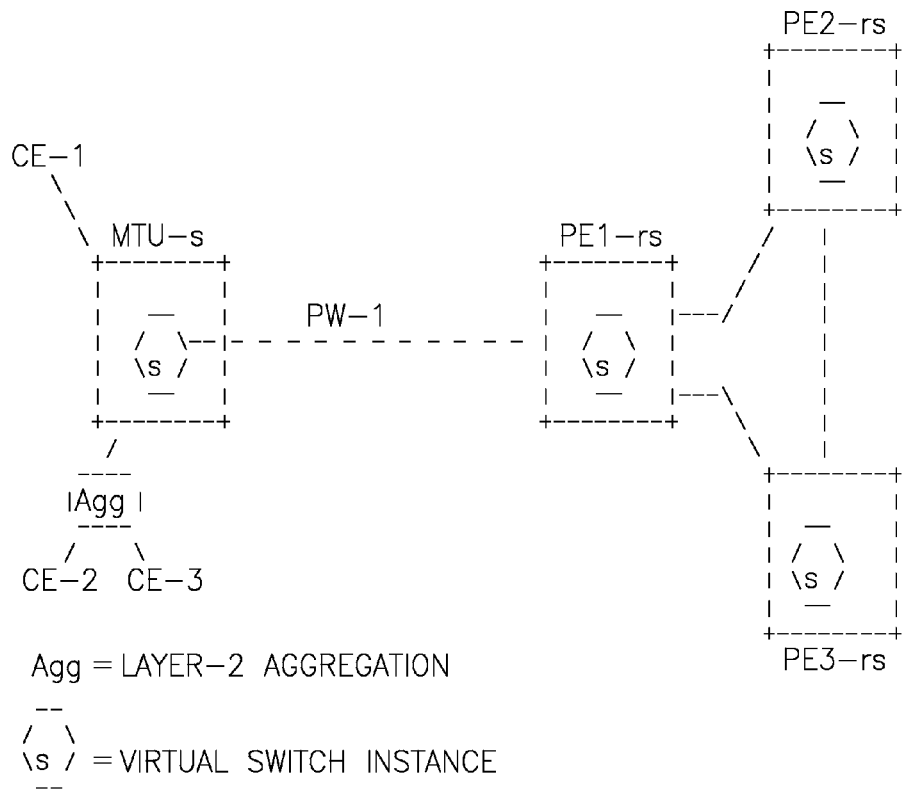
FIG. 1—illustrates an example of conveying traffic according to prior art H-VPLS configuration.
Figure 2:
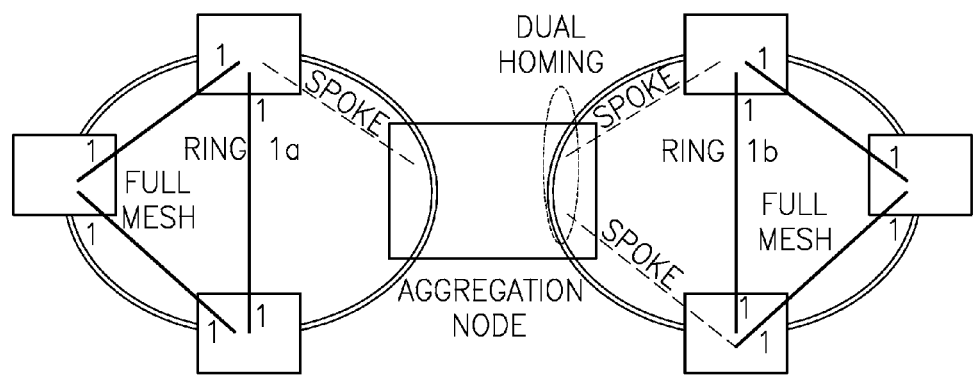
FIG. 2—demonstrates a prior art solution for connecting two VPLS domains via spokes.
Figure 3:
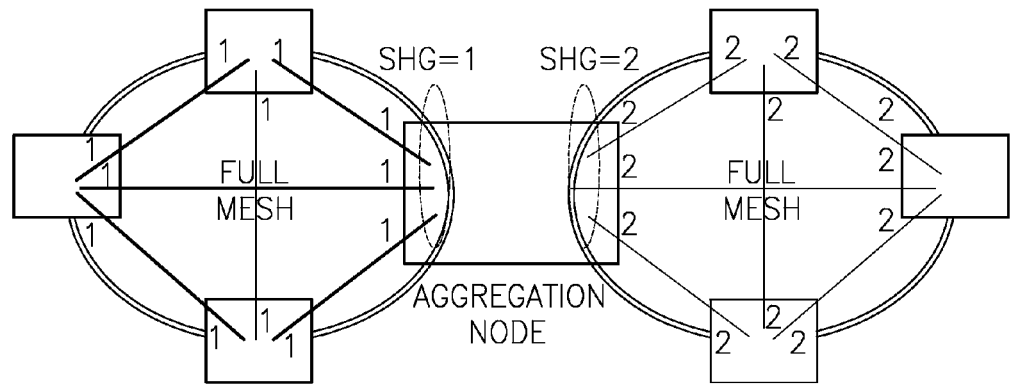
FIG. 3—demonstrates a solution for directly connecting two VPLS domains (not by using spoke PW as demonstrated in FIG. 2)
Figure 4:
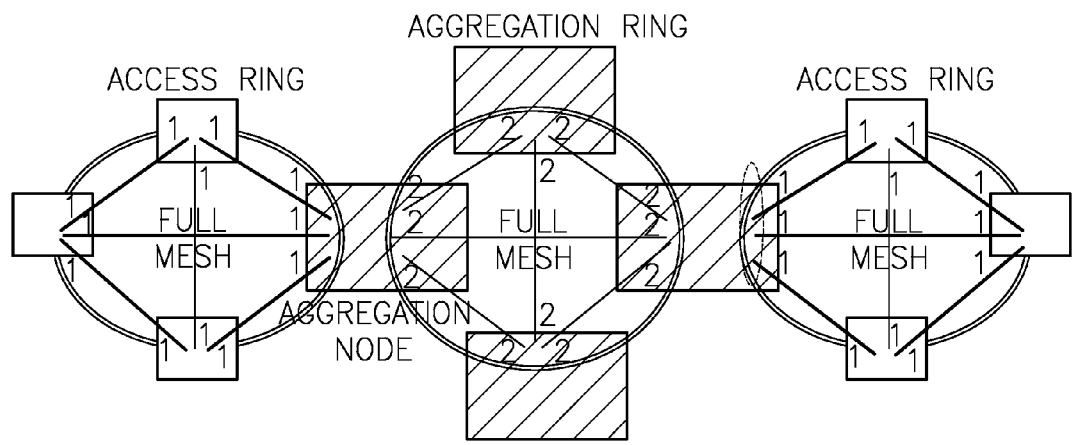
FIG. 4—exemplifies a multiple VPLS domains network.

FIG. 3 illustrates a configuration where multiple VPLS domains are used, while some of them can be handled at the same node for the same service. FIG. 3 addresses the issues raised when connecting domains via spokes, namely, the access nodes do not have to demonstrate high performance, and the load sharing between the two ring sides is achieved without dual homing mechanism. Unlike prior art solutions (e.g. the one demonstrated in FIG. 2) the configuration illustrated in FIG. 3 does not include the use of spoke PWs.

The following example demonstrates an algorithm which may be implemented in a management system (NMS) in order to carry out an embodiment of the present invention:

1. The user configures VPLS domains. The NMS calculates required PWs.
2. For each node participating in providing the service, the NMS maintains domain counter, which is used for auto-setting the SHG by the NMS. SHG members are local and separated at each node.
3. For each new traffic service, the domain counter for all nodes starts with the value of 1 (i.e., being reset for all nodes). As this algorithm is provided per service, there is no relationship/effect between different services provided at the same node.

Figure 5:
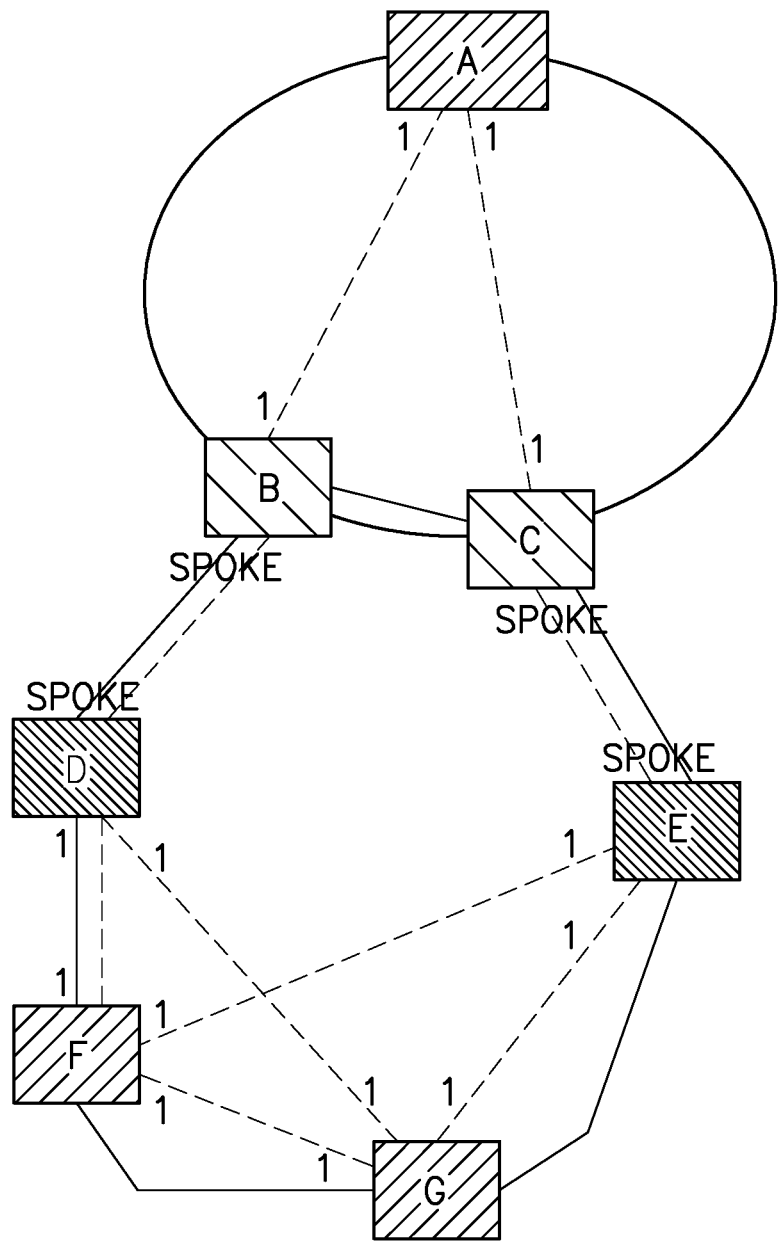
FIG. 5—presents a prior art example for using spokes with multiple VPLS domains.
Figure 6:
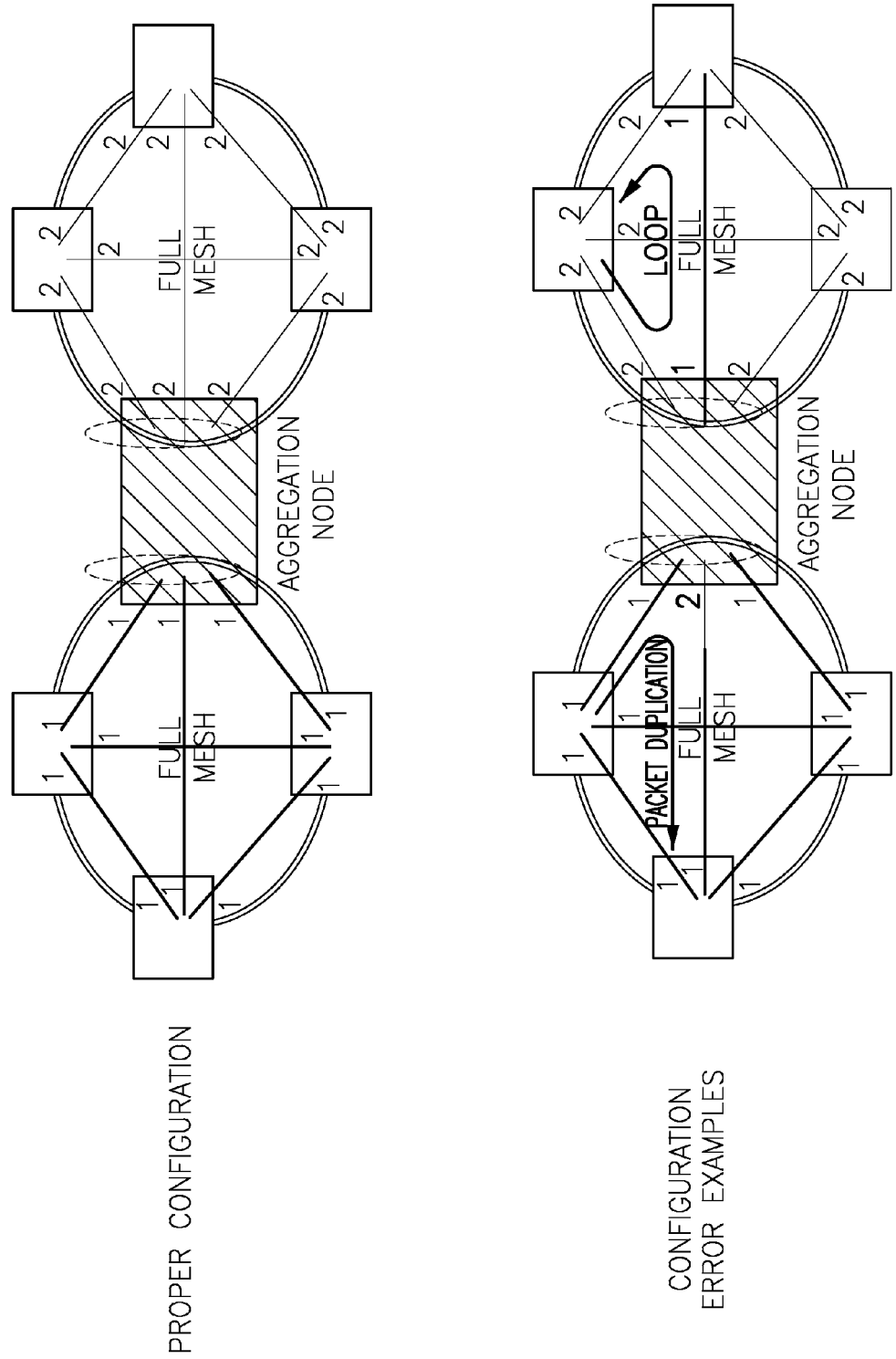
FIG. 6—illustrates an example of results occurred due to configuration error.

4. After each processed VPLS domain is processed at a certain node, the domain counter for that node is increased by the value of 1.
5. For all PWs included in a given domain, the NMS sets their calculated SHG according to the current domain counter of the PW head node, and starts with the processing of the next VPLS domain.
6. All PWs associated with the Spoke Domain are provided with the value null (a specific indication which means that there are no other such PWs associated with its SHG group.
7. As demonstrated in FIG. 5, if a domain includes two or more nodes (A, B, etc.) that are not service endpoints, then the following rule is performed in order to enable obtaining full connectivity via these two or more nodes, without creating loops:

The NMS allocates PWs extending between nodes A and B only if nodes A and B are associated with different domains. In other words, if nodes A and B are associated only with the same domain, then the NMS will not allocate PWs that will extend between A and B.

Exception/Addition: if nodes A and B have the same regular (non spoke) domains and have different spoke domains, which are mate spoke domains, the NMS will not allocate PWs that will extend between nodes A and B. In the example provided in FIG. 5, nodes B and C or nodes D and E do not need to be connected.

If spoke domains are not mate, the NMS allocates PWs that extend between nodes A and B.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for provisioning a loop free Hierarchical Virtual Private LAN Service (H-VPLS) traffic service in a multi-domain multi protocol label switching (MPLS) network, where the domains are interconnected there-between, the method comprising:
provisioning pseudo wires (PWs) for Multi-Point-to-Multi-Point (MPTMP) services in each domain of said multi-domain MPLS network;
defining multiple Split Horizon Groups (SHGs) in the network, wherein each SHG corresponds to a domain,
for said H-VPLS service traffic and for each specific node of the multi-domain MPLS network, automatically assigning indications to the SHGs and the pseudo wires connected to said specific node, wherein the same indication is assigned to all pseudo wires belonging to the same Split Horizon Group number (SHG-N), and wherein said step of assigning is characterized in that when traffic belonging to H-VPLS service crosses a border network node located between two interconnected domains, the SHG-N indication of PWs remains the same within a Virtual Private LAN Service (VPLS) domain, thereby preventing the service traffic from returning to the same domain from which it had been conveyed.

2. The method of claim 1, wherein the network is a full mesh connectivity network, where each network node is provided with a direct logical connection (PW) to any one of other network nodes.

3. The method of claim 2, wherein the PW spokes are further classified into real PW spokes having a termination point and virtual PW spokes being virtual entities, each connecting between two VPLS domains.

4. The method of claim 1, wherein said SHG indication depends on the service to be provisioning and the network node from which the traffic is being conveyed.

5. The method of claim 1, wherein the PWs are classified into two different classes of PWs, and/or the network domains are classified into two different classes.

6. The method of claim 5, wherein the network (VPLS) domains are classified into a first class being a regular PW domain, and second class, being a spoke domain.

7. The method of claim 5, wherein the network PWs are classified into a first class being regular PWs and a second class, being PW spokes.

8. The method of claim 7, wherein the PW spokes are further classified into real PW spokes having a termination point and virtual PW spokes being virtual entities, each connecting between two VPLS domains.

9. The method according to claim 1, adapted to handle pseudo wires which connect different VPLS domains via dual homing topologies, by defining dual homing PW connections as two spoke domains, and associating these spoke domains with their respective special SHG indications.

10. The method of claim 1, wherein the network (VPLS) domains are classified into a first class being a regular PW domain, and second class, being a spoke domain.

11. The method of claim 1, wherein the network PWs are classified into a first class being regular PWs and a second class, being PW spokes.

12. A method for provisioning a loop free Hierarchical Virtual Private LAN Service multipoint to multipoint (H-VPLS MPTMP) service in a multi protocol label switching (MPLS) network comprising a plurality of network nodes, wherein the method comprises:
(i) dividing the MPLS network into a plurality of Virtual Private LAN Service (VPLS) domains, and forming full mesh connectivity for each of the VPLS domains by interconnecting network nodes thereof using pseudo-wires (PWs);
(ii) associating each network node that belongs to two or more of the plurality of VPLS domains, to each of these two or more of the plurality of VPLS domains;
(iii) for each network node that belongs to two or more of the plurality of VPLS domains, automatically associating (e.g. numerating) each PW of a specific VPLS domain with a PW indication that corresponds to a Split Horizon Group number (SHG-N) of the specific VPLS domain, so that for each specific node of a specific VPLS domain, said indication is common (identical) to all PWs of the specific VPLS domain but different from indications of PWs of other VPLS domain(s) bordering with said specific VPLS domain at said respective network node; and
(iv) tan mining H-VPLS traffic of the MPTMP service via two or more VPLS domains in the MPLS network, wherein service traffic received along a first PW is prevented from being conveyed along a second PW associated with a PW indication that is identical to the PW indication associated with the first PW.

13. The method of claim 12, wherein the network is a full mesh connectivity network, where each network node is provided with a direct logical connection (PW) to any one of other network nodes.

14. The method of claim 12, wherein said SHG indication depends on the service to be provisioning and the network node from which the traffic is being conveyed.

15. The method of claim 12, wherein the PWs are classified into two different classes of PWs, and/or the network domains are classified into two different classes.

16. The method according to claim 12, adapted to handle pseudo wires which connect different VPLS domains via dual homing topologies, by defining dual homing PW connections as two spoke domains, and associating these spoke domains with their respective special SHG indications.

17. A network management entity comprising one or more processors coupled with a memory operative to automatically:
  associate each multi protocol label switching (MPLS) network node that belongs to two or more Virtual Private LAN Service (VPLS) domains of the MPLS network, to each of the two or more VPLS domains;
  for each network node that belongs to the two or more VPLS domains, associate each Pseudo-wire (PW) of a specific VPLS domain with a PW indication that corresponds to a Split Horizon Group number (SHG-N) of the specific VPLS domain, so that for each specific node of a specific VPLS domain, there is one indication that is shared by all PWs of the specific VPLS domain, but different from indications of PWs of other VPLS domain(s) bordering with that specific VPLS domain at the respective network node; and
  causing prevention of conveyance of service traffic received along a first PW from being conveyed along a second PW associated with a PW indication that is identical to the PW indication associated with the first PW, when Hierarchical Virtual Private LAN Service (H-VPLS) traffic of a Multi-Point-to-Multi-Paint (MPTMP) service will be transmitted via two or more VPLS domains in the MPLS network.

18. A computer program product encoding a computer program stored on a non-transitory computer-readable medium for executing a set of instructions by a computer system comprising one or more computer processors for establishing a process for provisioning of a loop free Hierarchical Virtual Private LAN Service multipoint to multipoint (H-VPLS MPTMP) service in a multi protocol label switching (MPLS) network comprising a plurality of network nodes, wherein the process comprises:
  (i) dividing the MPLS network into a plurality of Virtual Private LAN Service (VPLS) domains, and forming full mesh connectivity for each of the VPLS domains by interconnecting network nodes thereof using pseudowires (PWs);
  (ii) associating each network node that belongs to two or more of the plurality of VPLS domains, to each of these two or more of the plurality of VPLS domains, and assigning automatically to each of these two or more of the plurality of VPLS domains, a Split Horizon Group (SHG) indication associated with their respective network node;
  (iii) for each network node that belongs to two or more of the plurality of VPLS domains, automatically associating each PW of a specific VPLS domain with a PW indication that corresponds to a Split Horizon Group number SHG-N of the specific VPLS domain, so that for each specific node of a specific VPLS domain, said indication is common to all PWs of the specific VPLS domain but different from indications of PWs of other VPLS domain(s) bordering with said specific VPLS domain at said respective network node; and
  (iv) enabling transmission of H-VPLS traffic of the MPTMP service via two or more VPLS domains in the MPLS network, wherein service traffic received along a first PW is prevented from being conveyed along a second PW associated with a PW indication that is identical to the PW indication associated with the first PW.

\* \* \* \* \*